United States Patent [19]
Kanayama et al.

[11] Patent Number: 5,606,733
[45] Date of Patent: Feb. 25, 1997

[54] PORTABLE RADIO RECEIVER

[75] Inventors: Yoshiki Kanayama, Saitama; Ichiro Toriyama, Kanagawa, both of Japan

[73] Assignee: Sony Corporation, Tokyo, Japan

[21] Appl. No.: 248,960

[22] Filed: May 25, 1994

[30] Foreign Application Priority Data

May 28, 1993 [JP] Japan .................................. 5-127520

[51] Int. Cl.⁶ .............................. H04B 1/06; H04B 7/00
[52] U.S. Cl. .............................. 455/273; 455/89; 455/90; 455/277.1; 455/33.3
[58] Field of Search .............................. 455/89, 90, 273, 455/152.1, 33.3, 129, 13.3, 14, 272, 274, 277.1; 343/702, 725, 700 MS

[56] References Cited

U.S. PATENT DOCUMENTS

| | | | |
|---|---|---|---|
| 3,623,161 | 11/1971 | Yokohama et al. | 343/702 |
| 4,396,242 | 8/1983 | Kurano et al. | 339/14 R |
| 4,829,521 | 5/1989 | Hashimoto et al. | 455/89 |
| 4,879,563 | 11/1989 | Takeda et al. | 343/725 |
| 5,161,255 | 11/1992 | Tsuchiya | 455/345 |
| 5,412,392 | 5/1995 | Tsunekawa | 343/702 |

*Primary Examiner*—Reinhard J. Eisenzopf
*Assistant Examiner*—Gertrude Arthur
*Attorney, Agent, or Firm*—Limbach & Limbach L.L.P.

[57] ABSTRACT

A portable radio receiver for diversity reception in which electrical waves having different planes of polarization are received and synthesized at the receiving side using plural antennas. The radio receiver includes a metal casing, an external antenna mounted on one of the surfaces of the metal casing, and a single-side shorted microstrip antenna mounted on a surface of the metal casing so that its shorted surface is at right angles to the main polarization of the external antenna. In this manner, stable directivity and polarization diversity may be achieved in which the main polarization of the external antenna differs from that of the internal antenna and radiation patters are also different between the external antenna and the internal antenna.

8 Claims, 8 Drawing Sheets

FIG.1

(PRIOR ART)

(PRIOR ART)

PORTABLE RADIO RECEIVER

BACKGROUND OF THE INVENTION

This invention relates to a portable radio receiver for effectuating diversity reception using an external antenna and an enclosed antenna.

Among conventional reception systems by the portable radio receivers is a diversity reception system in which electrical waves having different planes of polarization of vertical polarization and horizontal polarization are synthesized at the receiving side using plural antennas for the purpose of preventing fading and achieving stable reception sensitivity.

Figure 1:
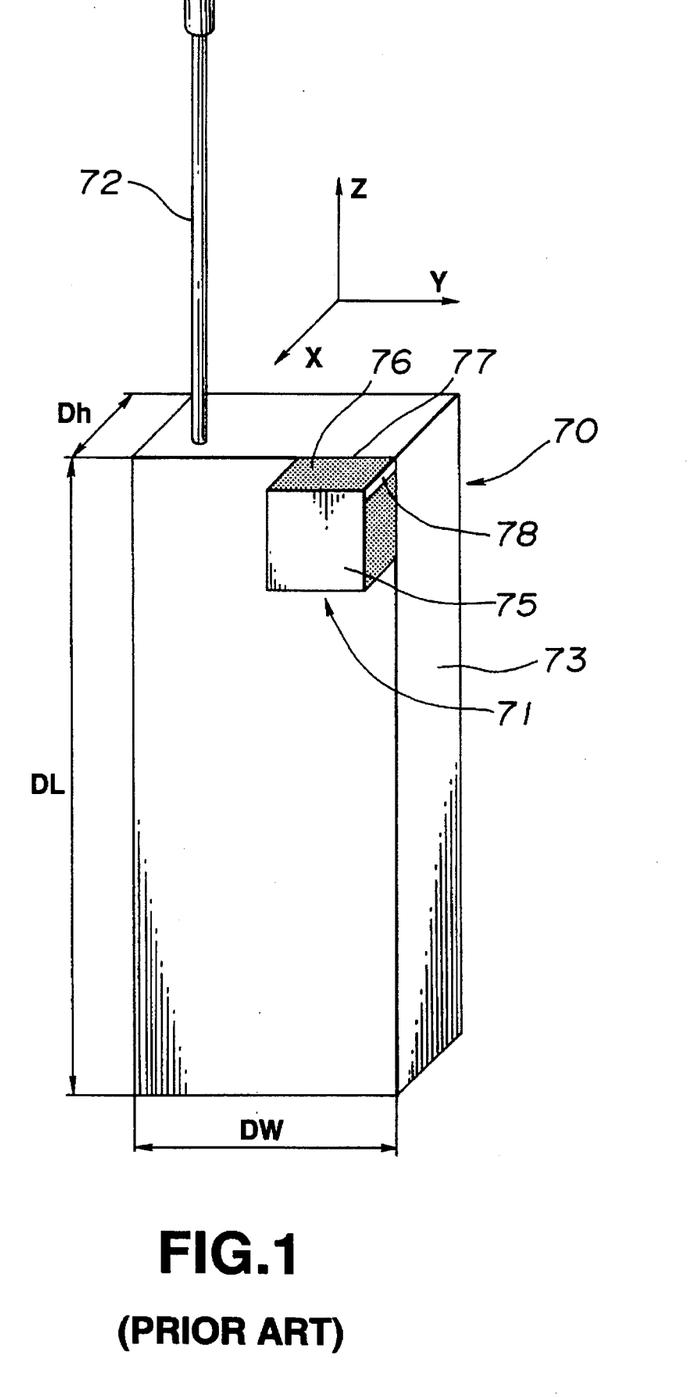
FIG. 1 is a schematic perspective view showing a conventional portable radio receiver.

In a majority of cases, as shown in FIG. 1, the portable radio receiver of the above-mentioned reception system has two antennas for diversity reception, namely an enclosed antenna, such as an inverted F antenna 71, and an external antenna 72, such as a whip antenna or a helical antenna. Among the enclosed antennas, the inverted F antenna, which can be reduced in size to the utmost among the known planar antennas, has become dominant.

Figure 2:
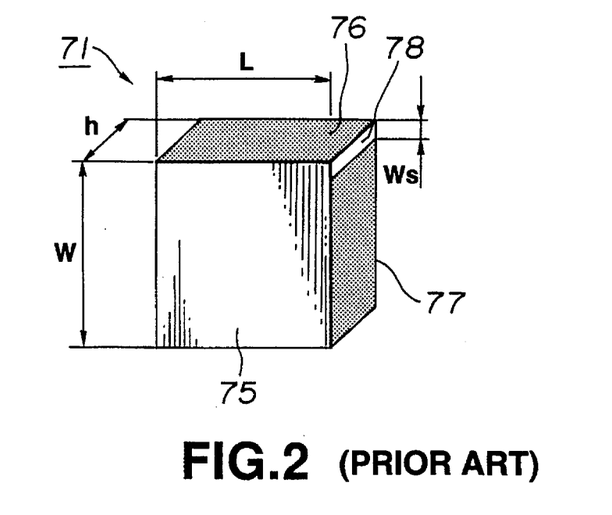
FIG. 2 is a schematic perspective view showing an inverted F antenna.

If, with the above-mentioned portable radio receiver 70, the external antenna 72, such as the whip antenna, is mounted upright on the upper surface of a metal casing 73, the enclosed antenna 71 is mounted with its ground-plane conductor 77 kept in contact with the lateral surface of the metal casing 73. This metal casing 73, an outer casing of the portable radio receiver 70, has a width DW, a length DL and a thickness Dh, as shown in FIG. 1. This inverted F antenna 71 has a radiating conductor 75, a dielectric substrate 76, a ground-plane conductor 77 and a shorting conductor 78, as shown in FIG. 2. If the shorting conductor has a width $W_S$ sufficiently smaller than the length L and the width W of the radiating conductor, the operation of the antenna 71 is produced at a frequency $L+W=\lambda_g/4$, where $\lambda_g$ is the guide wavelength whose value depends on the dielectric constant $\epsilon_r$ of the dielectric substrate 76 and is represented by $\lambda_g=\lambda_0/\sqrt{\epsilon_r}$, where $\lambda_0$ is the free space wavelength.

In general, when mounted on an infinitely large ground-plane conductor, the inverted F antenna has a narrow-width unidirectional radiation pattern, and hence is not desirable for use with the portable radio receiver.

However, the inverted F antenna may be improved in characteristics if mounted on the metal casing 73 which proves to be a ground-plane conductor having a small dimension (length) relative to the wavelength. With the free space wavelength $\lambda_0$ of the resonance frequency of the inverted F antenna, the antenna can be increased in bandwidth and thereby improved in characteristics if the ground-plane conductor has the length DL equal to 0.4 $\lambda_0$.

If, with the inverted F antenna having the carrier frequency in a 1.5 GHz range, for example, the dielectric substrate has the dielectric constant $\epsilon_r$ and a thickness h of 4.0 mm, the bandwidth when the standing-wave ratio (VSWR), that is the ratio of the maximum value to the minimum value of the standing wave, is 2 or less, is on the order of 70 MHz. The bandwidth of an inverted F antenna, mounted on an ground-plane conductor which may be regarded as being an infinitely large ground-plane conductor, was measured, and found to be 20 Mhz.

The radiation pattern is an eight-shaped pattern not exhibiting directivity within the horizontal plane (X-Y plane) and having a null character in the perpendicular direction (Z-axis direction). The diagonal direction including the shorting conductor 77 is the direction of the main polarization, with the sensitivity of the vertical polarization being substantially equal to that of the horizontal polarization. However, when actually installing the antenna on the portable radio receiver, it cannot necessarily be installed so that the length of the metal casing DL is equal to this optimum dimension 0.4 $\lambda_0$.

Figure 3:
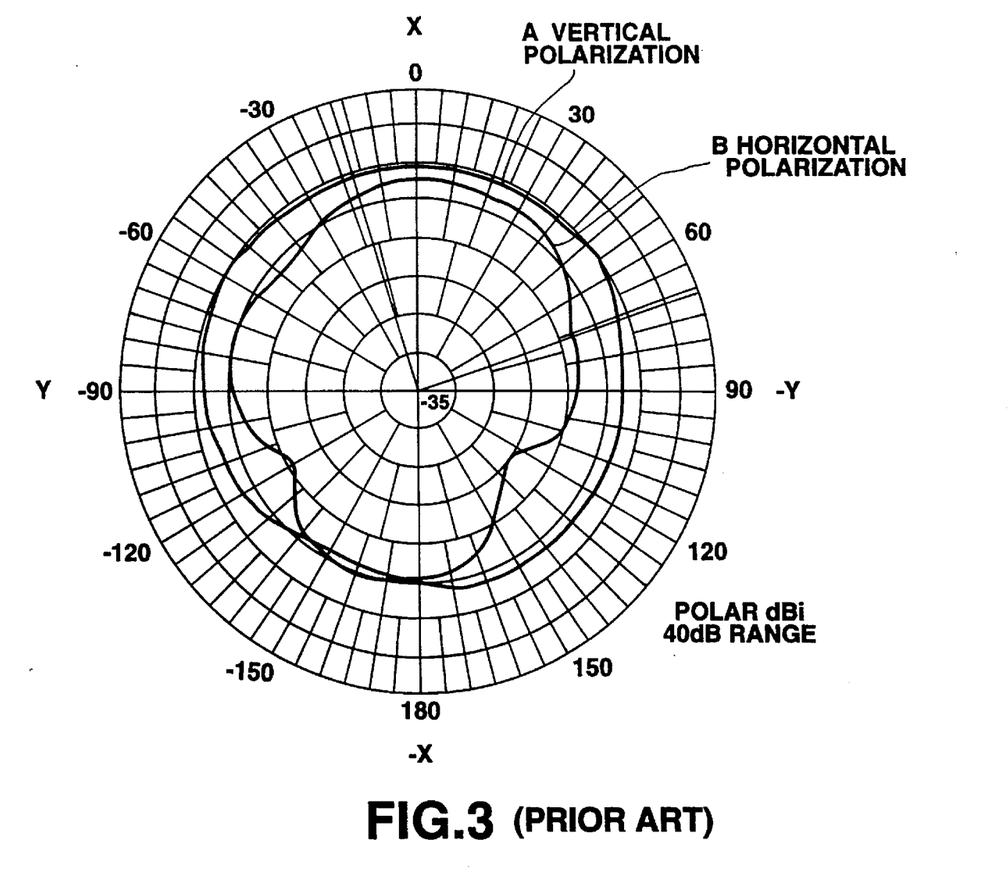
FIG. 3 shows a radiation pattern in the X-Y plane of an enclosed antenna of a conventional portable radio receiver.
Figure 4:
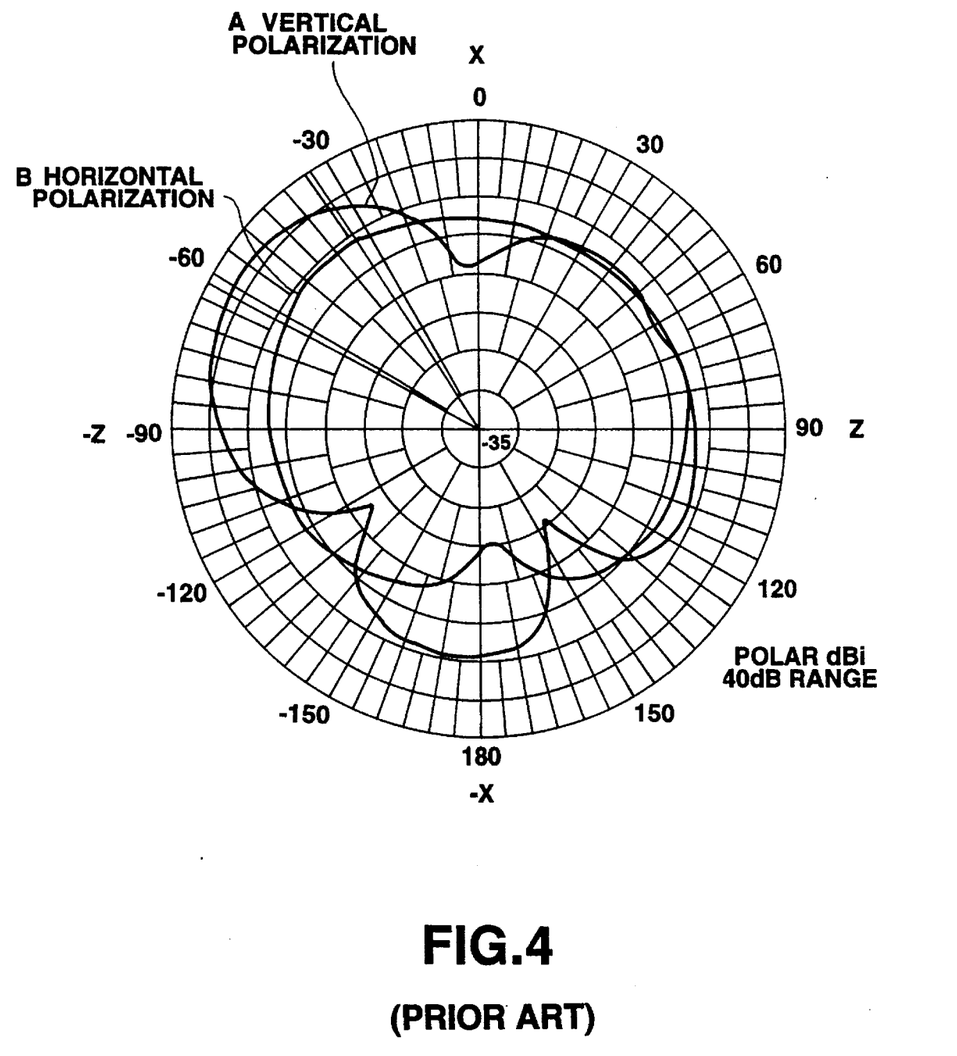
FIG. 4 shows a radiation pattern in the Z-X plane of the enclosed antenna of a conventional portable radio receiver.

The following are the characteristics of the inverted F antenna when the length of the metal casing DL is set to 0.6 $\lambda_0$. With the inverted F antenna having the carrier frequency in the 1.5 GHz range, which is the same as that installed on the ground-plane conductor having the length equal to 0.4 $\lambda_0$, the bandwidth is decreased to approximately 35 MHz. The radiation pattern is such that the beam peak is shifted from the horizontal direction in the vertical direction (Z-X plane) shown in FIG. 4 and the gain in the horizontal plane (X-Y plane) shown in FIG. 3 is decreased. As for the coordinates, the X, Y and X axes are set as shown in FIG. 2. The vertical polarization is the main polarization. In FIGS. 2 and 3, curves A and B represent vertical polarization and horizontal polarization, respectively.

The above holds true for the external antenna 72, such as the whip antenna. That is, when the antenna is mounted on an ideal ground-plane conductor, the beam peak is shifted in a known manner from the horizontal direction, under the effect of the casing, as in the case of the inverted F antenna, with the gain being decreased in the horizonal plane. The vertical polarization represents the main polarization.

Among the techniques of diversity reception, so far known in the art, there are the space diversity of synthesizing and averaging signal currents received by receiving antennas hundreds of meters away from the receiving station, the directivity diversity of raising the sensitivity of the electrical waves emanating from a particular direction, and the polarization diversity, which is utilized when the electrical waves refracted and reflected by an ionized layer undergo deviation in amplitude and phase depending on the direction of propagation.

However, when the inverted F antenna is installed on a portable radio receiver not providing the optimum ground-plane conductor dimension for diversity reception, the radiation pattern of the external antenna, such as the whip antenna, becomes extremely similar to that of the enclosed inverted F antenna, so that the effect of directivity diversity is diminished. On the other hand, since the vertical polarization becomes the main polarization, the effect of polarization diversity is also minute. Thus the space diversity represents main diversity. However, since the external antenna and the enclosed antenna are installed on the small-sized casing, a sufficient antenna-to-antenna distance cannot be maintained, so that the diversity effect by the space diversity is also restricted.

SUMMARY OF THE INVENTION

In view of the above-described status of the art, it is an object of the present invention to provide a portable radio receiver in which a single-side shorted microstrip antenna is employed as an enclosed antenna for realizing more stable diversity reception.

The present invention provides a portable radio receiver designed for diversity reception. The radio receiver includes a metal casing, an external antenna mounted on the upper surface of the casing, and a single-side shorted microstrip antenna mounted on the lateral side of the metal casing so that its shorted surface extends parallel to the main polarization of the external antenna.

The portable radio receiver according to the present invention includes an external antenna installed on one surface of a metal casing and a single-side shorted microstrip antenna installed on a surface of the casing extending at right angles to the main polarization of the external antenna.

By mounting the single-side shorted microstrip antenna on a lateral surface of the metal casing so that its shorted surface is parallel to the main polarization of the external antenna, the portable radio receiver may be provided having different radiation patterns and having the polarization of the external antenna different from that of the enclosed antenna, so that stable diversity effects may be produced.

Other objects and advantages of the present invention will become more apparent from the following description of the preferred embodiments especially when read in conjunction wit the accompanying drawings.

DESCRIPTION OF THE PREFERRED EMBODIMENTS

Figure 5:
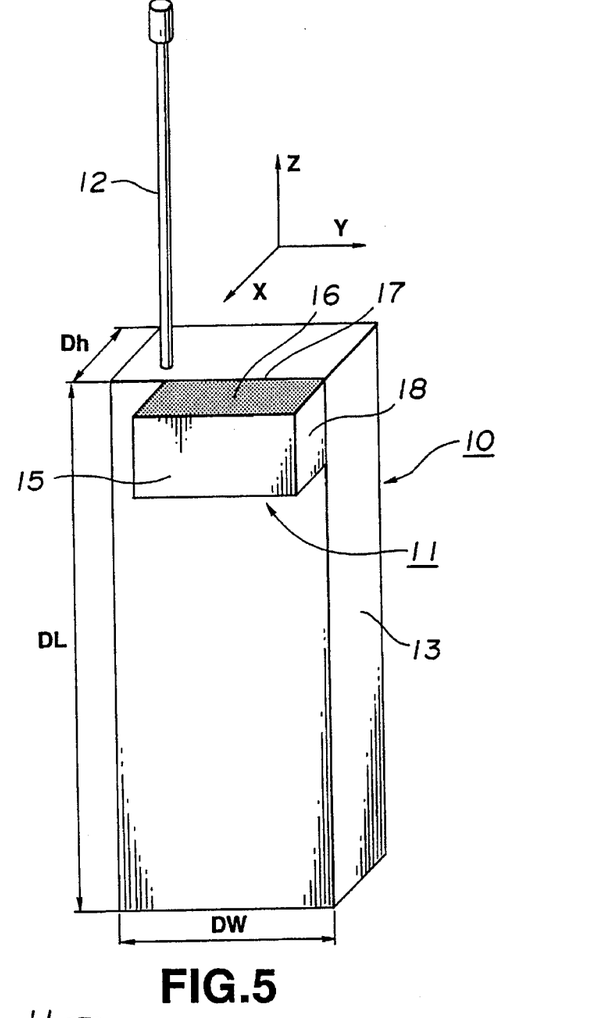
FIG. 5 is a schematic perspective view showing a portable radio receiver according to a first embodiment of the present invention.

Referring to the drawings, several embodiments of the portable radio receivers according to the present invention are explained. If, with the first embodiment of the present invention, an external antenna 12, which is a so-called whip antenna, is mounted upright on the upper surface of a metal casing 13, an enclosed antenna 11, which is a single-side shorted microstrip antenna, is mounted with its ground-plane conductor 17 kept in contact with the lateral side of the metal casing 10, as shown in FIG. 5. That is, the enclosed antenna 11, which is the single-side shorted microstrip antenna, is mounted so that its shorted surface runs parallel to the main polarization of the external antenna 12 which is extended along the Z axis in FIG. 5. Similarly to the portable radio receiver 70 shown in FIG. 1, the portable radio receiver 10 has a metal casing 13, as an outer casing, which has a width DW, a length DL and a thickness Dh.

Figure 6:
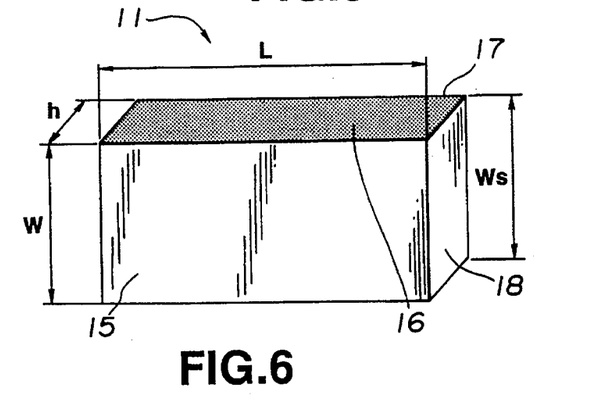
FIG. 6 is a schematic perspective view showing a single-side shorted microstrip antenna.

FIG. 6 shows the basic structure of the enclosed antenna 11 which is the single-sided shorted micro-strip antenna. The enclosed antenna 11 is made up of a radiating conductor 15, a dielectric substrate 16 and a ground-plane conductor 17, stacked together. Thus the enclosed antenna has the radiating conductor 15 and the ground-plane conductor 17, similarly to the usual microstrip antenna. However, the enclosed antenna 11 has a length $W_S$ of the shorting conductor 18 equal to the width W of the radiating conductor 15. That is, the enclosed antenna 11 has the radiating conductor 15 and the ground-plane conductor 17 shorted in their entirety by the shorting conductor 18 ($W_S$=W).

While the radiating conductor of the usual microstrip antenna has a length equal to 2L, the enclosed antenna 11, which is the single-side shorted microstrip antenna, has the radiating conductor having a length L, that is one-half of the radiating conductor length of the usual microstrip antenna, by having the mid part of the microstrip antenna, affording a zero potential, shorted with the ground-plane conductor, in order to achieve the same resonant frequency.

The width W of the radiating conductor 15 and the thickness h of the dielectric substrate 16 mainly contribute to the bandwidth and the efficiency of the antenna. On the other hand, the dielectric constant $\epsilon_r$ of the dielectric substrate 16 determines the guide wavelength and hence represents a crucial factor which not only influences the length of the radiating conductor 15 but also determines the antenna efficiency. In general, the smaller the value of $\epsilon_r$, the higher is the antenna efficiency, such that the antenna efficiency is decreased with increase in $\epsilon_r$.

The single-side shorted microstrip antenna, constituting the enclosed antenna, has its main polarization in a direction orthogonal to the shorting conductor 18. Consequently, by mounting the microstrip antenna on the lateral surface of the metal casing 13 as the outer casing of the radio receiver 10 so that the shorted surface of the single-side shorted microstrip antenna, that is the surface of the shorting conductor 18, is parallel to the main polarization of the external antenna 12, the direction of the main polarization of the external antenna 12 is at right angles to that of the main polarization of the enclosed antenna 11, so that stable diversity reception may be achieved.

Although susceptible to deviation in resonant frequency caused by the end effects due to the thickness of the dielectric substrate, the single-side shorted microstrip antenna is basically operated at a frequency for which the length L of the radiating conductor becomes equal to $\lambda_g/4$.

Figure 7:
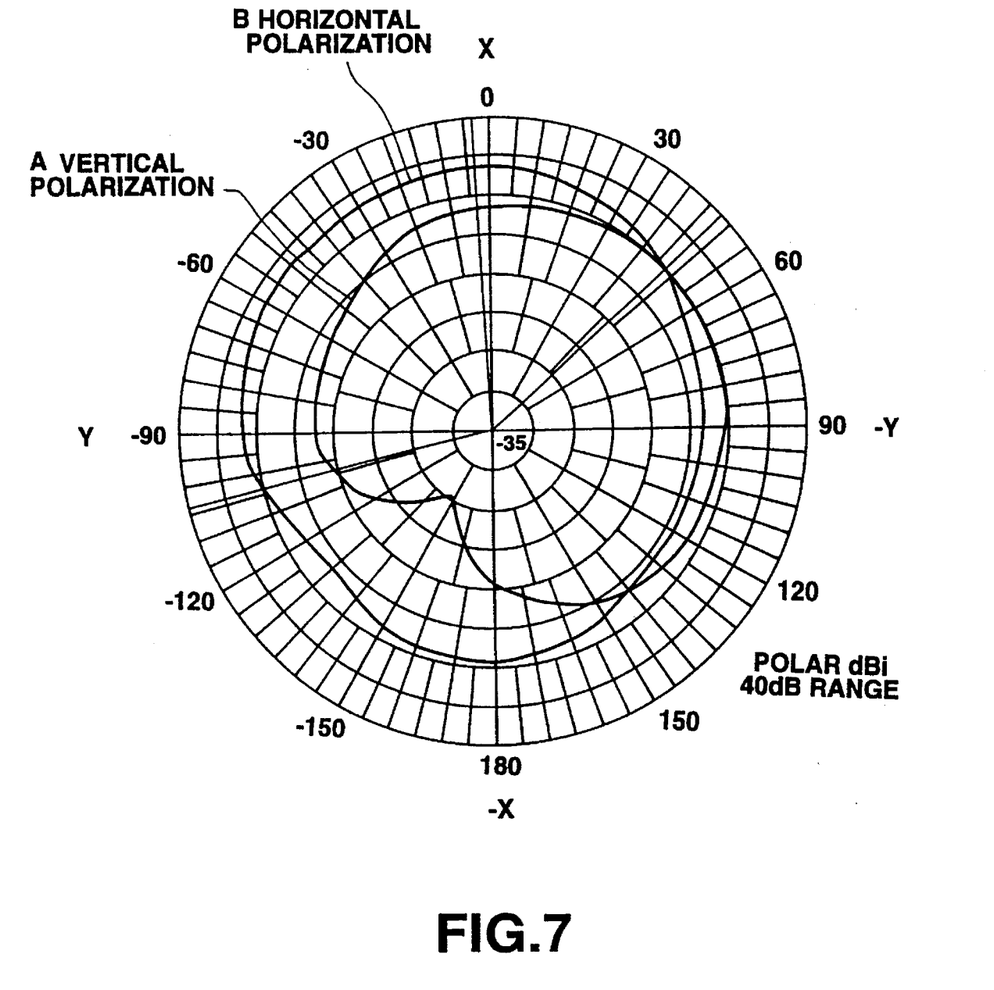
FIG. 7 shows a radiation pattern in the X-Y plane of an enclosed antenna of a portable radio receiver according to the present invention.
Figure 8:
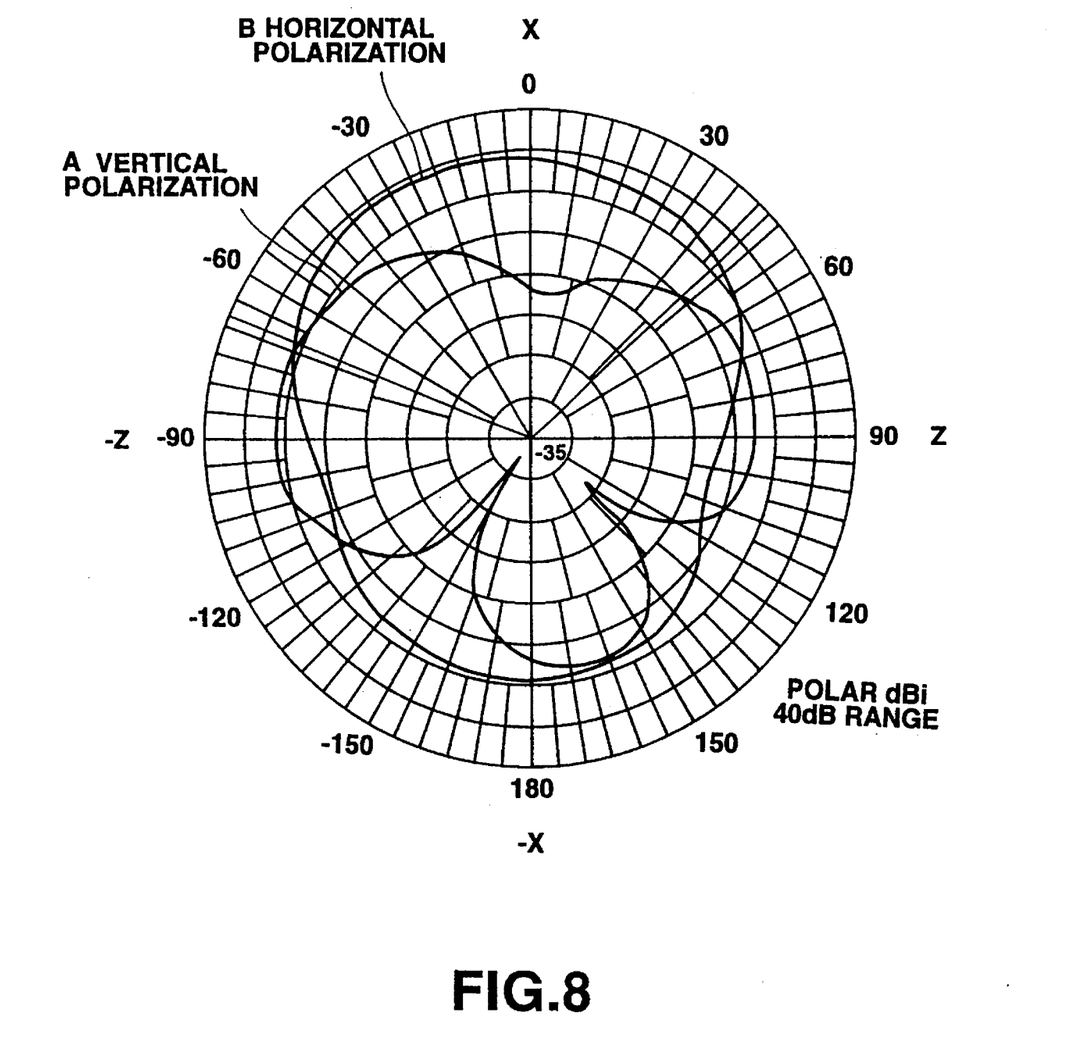
FIG. 8 shows a radiation pattern of the Z-X plane of an enclosed antenna of a portable radio receiver according to the present invention.

The first embodiment is hereinafter explained with reference to illustrative dimensional values. If, with the portable radio receiver having the carrier frequency in the bandwidth of 1.5 GHz, the metal casing has the length DL equal to 120 mm, such length corresponds to 0.6 $\lambda_g$ in terms of the wavelength. As for the parameters of the single-side shorted microstrip antenna, L=27.5 mm, W=19.0 mm, h=4 mm and $\epsilon_r$=3.5. As for the radiation characteristics of the antenna, the bandwidth for the standing-wave ratio (VSWR)≦2 is 24 MHz, and the radiation pattern is as shown in FIGS. 7 and 8 for the X-Y and Z-X planes, respectively. In FIGS. 7 and 8, curves A and B represent the vertical polarization and the horizontal polarization, respectively.

As for the radiation pattern, there is no shift of the peak of the beam shown in FIG. 8, within the vertical plane (Z-X plane) shown in FIG. 8. Within the horizontal plane (X-Y plane) shown in FIG. 7, a peak value on the order of −2 dB is produced, with the beam width being significantly broader than that of the inverted F antenna. In addition, the main polarization is the horizontal polarization, in distinction from the case of the inverted F antenna. Consequently, the main polarization of the enclosed antenna has the radiation pattern different from that of the external antenna. On the other hand, the main polarization of the enclosed antenna is at right angles to that of the externa antenna.

Figure 9:
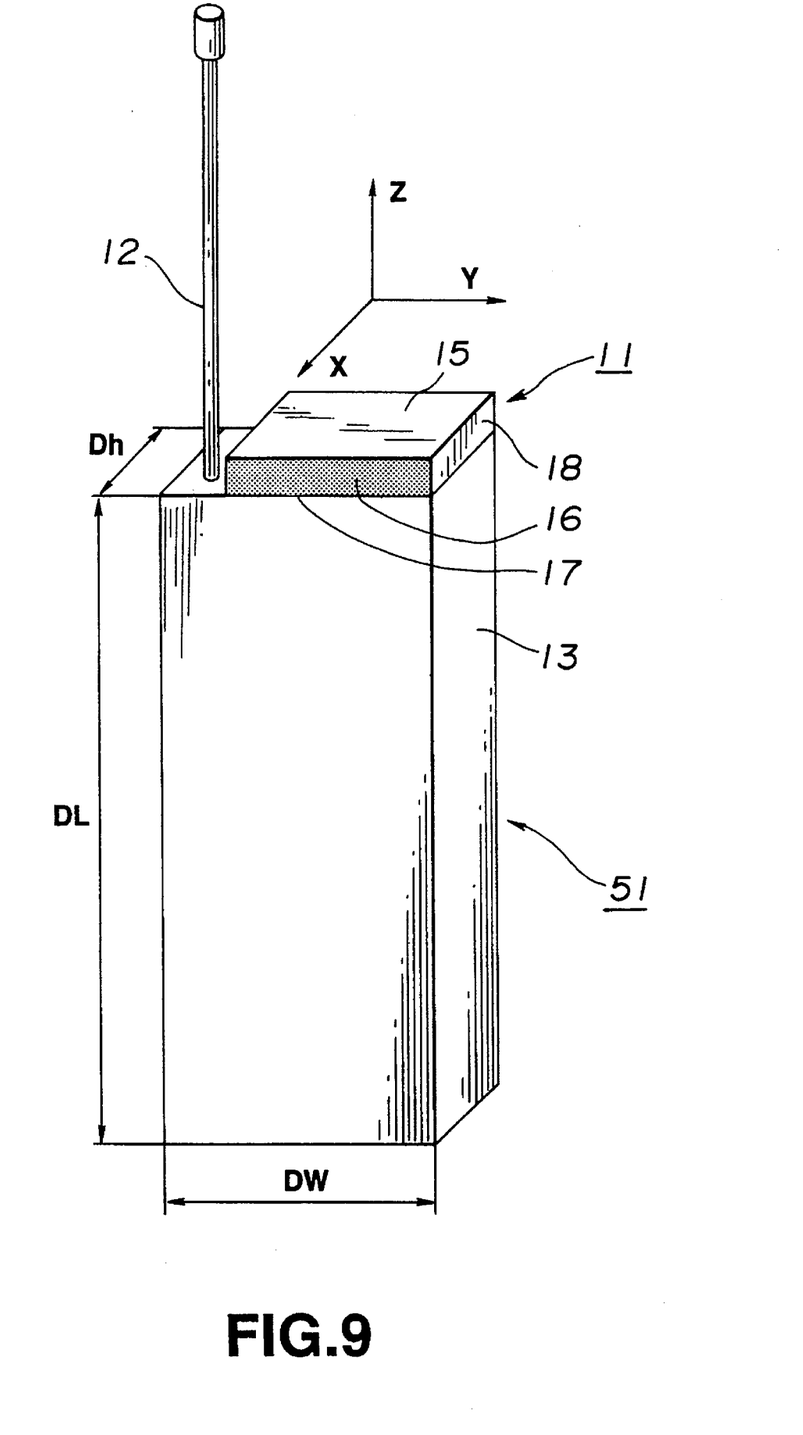
FIG. 9 is a schematic perspective view showing a portable radio receiver according to a second embodiment of the present invention.

Second and third embodiments of the portable radio receiver of the present invention are hereinafter explained. Referring to FIG. 9, assuming that the surface of the metal casing 13 of a portable radio receiver 51 having the external antenna is its upper surface, with the opposite surface thereof being its bottom surface, the enclosed antenna 11, which is the single-side shorted microstrip antenna, is mounted on the upper surface and on the bottom surface of the metal casing 13 in the second embodiment shown in FIG. 9 and in the third embodiment shown in FIG. 10, respectively.

Figure 10:
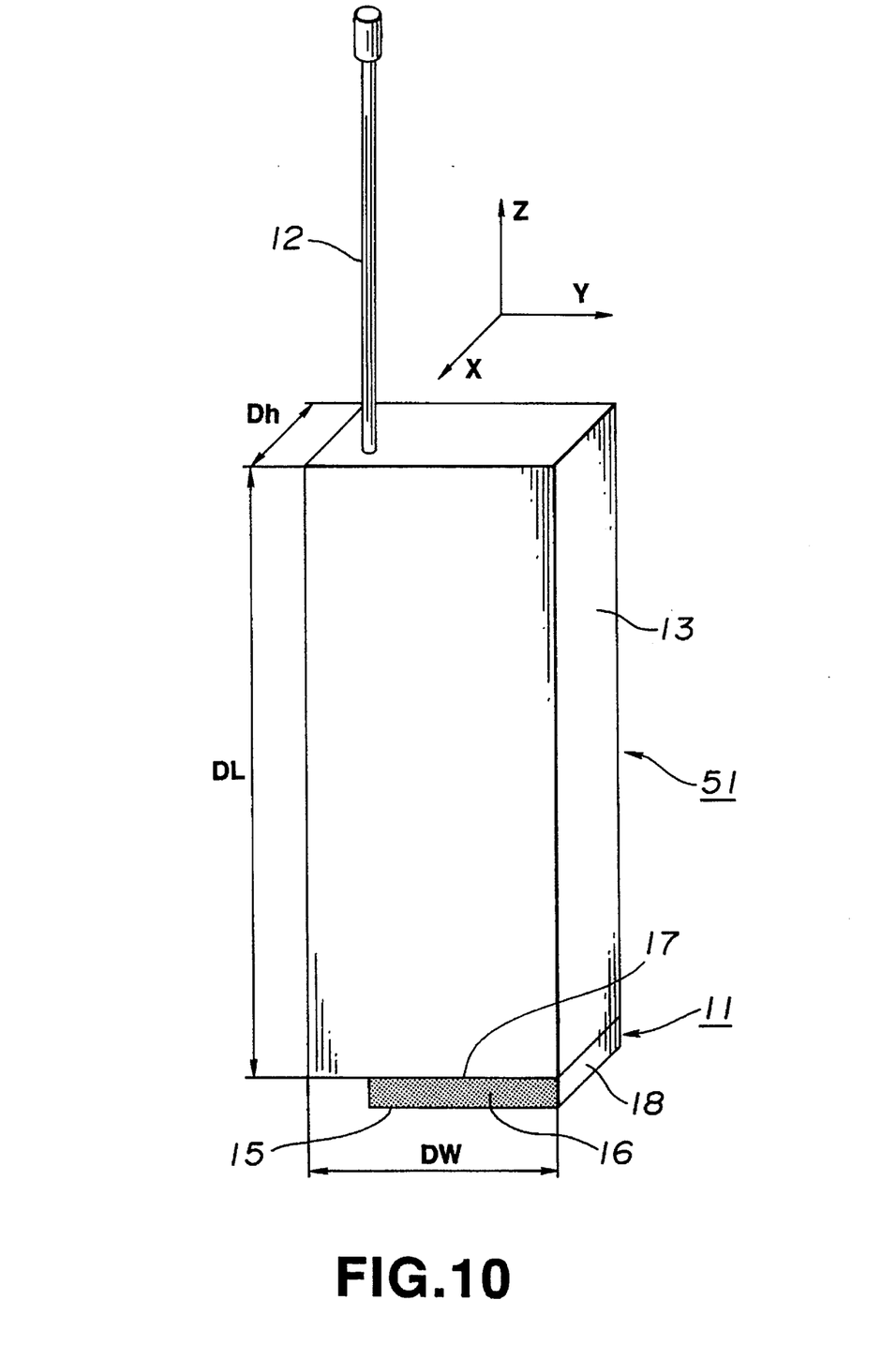
FIG. 10 is a schematic perspective view showing a portable radio receiver according to a third embodiment of the present invention.

With the above-described second and third embodiments, since the external antenna 12, such as the whip antenna, is mounted upright on the upper surface of the metal casing 13, a main polarization orthogonal to the external antenna 12 is achieved, irrespective of the mounting direction of the enclosed antenna 11, which is a single-side shorted microstrip antenna, that is irrespective of the direction in which the dielectric substrate 16 is directed within the X-Y plane. In addition, since the plane of the radiating conductor is directed in an upward or downward direction in which the directivity of the external antenna 12 is deteriorated, that is, the plane of the radiating conductor is at right angles to the plane of vibration of the main polarization, which is the direction of the main polarization of the external antenna 12, a radiation pattern different from that of the external antenna 12 may be achieved.

What is claimed is:

1. A portable radio receiver for diversity reception comprising a metal casing, at least one external antenna mounted on an upper surface of the metal casing, and a single-side shorted microstrip antenna mounted on a lateral surface of the metal casing so that a shorted surface thereof is parallel to the main polarization of the external antenna.

2. A portable radio receiver for diversity reception comprising a metal casing, at least one external antenna mounted on a pre-set, external surface of the metal casing, and a single-side shorted microstrip antenna mounted on the external surface of the metal casing and having its main polarization perpendicular to the main polarization of the external antenna.

3. The portable radio receiver as claimed in claim 2 wherein the external surface on which the single-side shorted microstrip antenna is mounted is the same external surface as the external surface mounting the external antenna.

4. The portable radio receiver as claimed in claim 2 wherein the external surface on which the single-side shorted microstrip antenna is mounted is an external surface opposite to the external surface mounting the external antenna.

5. A portable radio receiver for diversity reception comprising a metal casing, at least one external antenna mounted on an upper surface of the metal casing, and a single-side shorted microstrip antenna mounted on a lateral surface of the metal casing, the single-side shorted microstrip antenna including a ground plane conductor, a radiating conductor which is parallel to the ground plane conductor, a dielectric substrate interposed between the ground plane conductor and the radiating conductor, and a shorting conductor for connecting the radiating conductor to the ground plane conductor, wherein the shorting conductor is rectangularly shaped so as to have two longer edges and two shorter edges and is oriented so that its length and width lie in a hypothetical plane which extends parallel to the length of the external antenna, and further wherein the shorting conductor is attached at every point along its two longer edges to every point along the width of the radiating conductor and the ground plane conductor, respectively.

6. The portable radio receiver as claimed in claim 5 wherein the surface on which the single-side shorted microstrip antenna is mounted is the same surface as the surface mounting the external antenna and the radiating conductor and the ground plane conductor lie in planes parallel to the surface mounting the external antenna.

7. The portable radio receiver as claimed in claim 5 wherein the surface on which the single-side shorted microstrip antenna is mounted is the surface opposite to the surface mounting the external antenna and the radiating conductor and the ground plane conductor lie in planes parallel to the surface mounting the external antenna.

8. A portable radio receiver for diversity reception comprising a metal casing, at least one external antenna mounted on an upper surface of the metal casing, and a single-side shorted microstrip antenna mounted on a lateral surface of the metal casing, the single-side shorted microstrip antenna including a ground plane conductor, a radiating conductor which is parallel to the ground plane conductor, a dielectric substrate interposed between the ground plane conductor and the radiating conductor, and a shorting conductor for electrically connecting the radiating conductor to the ground plane conductor, wherein the dielectric substrate is cube shaped and the shorting conductor substantially covers a face of the dielectric substrate which lies in a plane which is parallel to the length of the external antenna.

* * * * *